US009113497B2

(12) United States Patent
Smith, II et al.

(10) Patent No.: US 9,113,497 B2
(45) Date of Patent: Aug. 18, 2015

(54) NON-CELLULAR WIRELESS ENTERTAINMENT PHONE, SYSTEM AND ARCHITECTURE

(71) Applicants: Michael Edward Smith, II, Lago Vista, TX (US); Angela Marie Smith, Lago Vista, TX (US)

(72) Inventors: Michael Edward Smith, II, Lago Vista, TX (US); Angela Marie Smith, Lago Vista, TX (US)

(73) Assignee: Yip Yap, Inc., Lago Vista, TX (US)

( * ) Notice: Subject to any disclaimer, the term of this patent is extended or adjusted under 35 U.S.C. 154(b) by 176 days.

(21) Appl. No.: 13/714,235

(22) Filed: Dec. 13, 2012

(65) Prior Publication Data

US 2013/0157655 A1 Jun. 20, 2013

Related U.S. Application Data

(60) Provisional application No. 61/576,583, filed on Dec. 16, 2011.

(51) Int. Cl.
*H04W 4/00* (2009.01)
*H04W 88/06* (2009.01)
*H04M 1/66* (2006.01)
*H04M 1/725* (2006.01)

(52) U.S. Cl.
CPC .......... *H04W 88/06* (2013.01); *H04M 1/72544* (2013.01); *H04M 1/72563* (2013.01); *H04M 1/72525* (2013.01); *H04M 2250/02* (2013.01)

(58) Field of Classification Search
CPC ..................... H04M 1/72544; H04M 1/42563; H04M 88/06; H04L 12/2816; H04W 88/06; H04W 84/20; H04W 4/005; H04W 56/001; A63F 2300/406; A63F 2300/63; H04N 1/00307
USPC ........................................................ 455/426.1
See application file for complete search history.

(56) References Cited

U.S. PATENT DOCUMENTS

| 6,346,873 | B1 * | 2/2002 | Suzuki et al. ................ 340/3.41 |
| 7,869,792 | B1 | 1/2011 | Zhou et al. |
| 2006/0293057 | A1 * | 12/2006 | Mazerski et al. ............. 455/445 |
| 2008/0062141 | A1 * | 3/2008 | Chandhri ....................... 345/173 |
| 2008/0146211 | A1 * | 6/2008 | Mikan et al. .................. 455/419 |
| 2009/0061907 | A1 * | 3/2009 | Richardson et al. .......... 455/458 |
| 2011/0185399 | A1 | 7/2011 | Webber et al. |
| 2011/0237221 | A1 | 9/2011 | Prakash et al. |

OTHER PUBLICATIONS

International Preliminary Report on Patentability issued for PCT Application No. PCT/US2012/69580, mailed Jun. 26, 2014, 7 pages.
International Search Report and Written Opinion issued for PCT Application No. PCT/US2012/69580, completed Feb. 8, 2013 and mailed Feb. 26, 2013, 8 pages.

* cited by examiner

Primary Examiner — Timothy Pham
(74) Attorney, Agent, or Firm — Sprinkle IP Law Group

(57) ABSTRACT

A non-cellular wireless entertainment phone device may have at least two modes of operation. Each of the modes of operation may have a particular set of functionality. A first set of functionality may allow phone communications through a cellular phone, a wireless device, or the Internet. Additional functionality may transform the device into an entertainment device/child's toy or other types of devices such as a remote control, game controller, two-way radio transceiver, motion sensor, etc. A control signal may be sent from another device to cause a switching between modes.

20 Claims, 6 Drawing Sheets

NON-CELLULAR WIRELESS ENTERTAINMENT PHONE, SYSTEM AND ARCHITECTURE

CROSS-REFERENCE TO RELATED APPLICATION(S)

This is a conversion of and claims a benefit of priority under 35 U.S.C. §119(e) from Provisional Application No. 61/576,583, filed Dec. 16, 2011, entitled "NON-CELLULAR WIRELESS ENTERTAINMENT PHONE, SYSTEM AND ARCHITECTURE," which is fully incorporated herein by reference.

TECHNICAL FIELD

This disclosure relates generally to electronic communication devices and entertainment devices for children. More particularly, embodiments disclosed herein relate to a new class of non-cellular wireless handsets and infrastructural systems, architecture, and operation methodologies supporting same.

BACKGROUND OF THE RELATED ART

Today, children are surrounded by "smart" devices that did not exist a mere decade ago. For example, a cellular phone (also known as a mobile or cell phone) was used mainly to make and receive phone calls. Nowadays, a smart phone can function as a personal digital assistant, a portable media player, an Internet browser, a gaming device, a camera, an electronic book reader, a flash light, and so on, in addition to making and receiving phone calls, text messages, and e-mails.

As cellular phones continue to grow in functionality and popularity, they have become accessible to young children or even toddlers. Smart phone applications such as Toddler Lock™ and others demonstrate the aspirational status of mobile phones as it relates to children as young as 12-24 months of age. However, mobile phones are not toys and can be quite expensive. Parents may not want to hand a child an expensive cell phone and risk damaging the phone, not to mention risking the child accidently deleting an application or e-mail, hanging up on a call, inadvertently answering a call, or some other unintended consequence attributed to the child. Also, the potential health risks associated with exposure to electromagnetic radio frequency waves or low-level radiation emitted by these phones is a concern. Further, mobile phones open a child up to the dangers associated with undesirable exposure to inappropriate content as well as access to/from people with whom the parent(s) of that child may not want their child to have communication access. Toy phones, on the other hand, are designed to be entertaining, age-appropriate, safe, and are relatively inexpensive. Although toy phones may resemble a variety of mobile phone handsets, they generally provide very limited, if any, functions other than ring tones and prerecorded messages, and entirely lack any capability of actual over-the-airwaves communication or smart functionality.

Currently, there is not a clear bridge between mobile phones and toy phones. Further, there is not a safe communication device solution for children that allows for complete and total usage controls by the parent affording them the peace of mind they desire when contemplating giving their child a traditional mobile phone. Consequently, there is room for innovations and improvements.

SUMMARY OF THE DISCLOSURE

Embodiments disclosed herein provide a handheld device that can switch between different modes of operation. Each of the modes of operation may have a particular set of functionality. For example, a set of functionality may allow phone communications through a cellular phone, a wireless device, or the Internet. Additional functionality may transform the handheld device into a child's toy or other types of devices such as a remote control, game controller, two-way radio transceiver, motion sensor, etc.

As a specific example, one embodiment provides a system having a first wireless device and a second wireless device. Examples of a first wireless device can include a cellular phone or a hub or any device capable of directly or indirectly connecting to a wireless network (such as a cellular network), an Internet protocol network, or a combination thereof. The second wireless device may not have any component that is capable of producing an electromagnetic field but may be equipped with a communication component suitable for receiving and transmitting wireless signals such as Bluetooth signals. The second wireless device may further include at least one processor and a memory containing instructions implementing a plurality of modes of operations, including a linked/phone mode and an entertainment/toy mode. In the linked/phone mode, the second wireless device can function as a robust non-cellular wireless phone. In the entertainment/toy mode, the second wireless device can function as a toy play phone and/or entertainment device. The switch between these modes can be done in various ways. In one embodiment, the switching on the second wireless device can be done by sending a control signal from the first wireless device. For the sake of illustration, the first wireless device may be referred to as a parent device and the second wireless device may be referred to as a child device.

Embodiments disclosed herein can provide many advantages. Take the aforementioned child device for example, in the entertainment/toy mode, the child device can entertain and educate a child whether the child device is or is not actively connected to the parent device. This is possible because the scopes of the invention extend beyond the handset and may include website(s), applications, activities, and games and other devices that utilize various features of the device. For example, a child could visit a website implementing an embodiment of the invention. The child may play an online game at the website. In response to an action by the child, a server hosting the website may operate to establish an audio or data connection to the device and place simulated wireless and/or wired phone calls via Bluetooth, Wi-Fi, radio frequency (RF) or other communications means or send text/picture/video messages as part of a game play. The level of access and parties the child is able to communicate with can be entirely controlled by a parent or an authorized user via software running a server hosting the website or on a mobile device communicatively connected to the server, providing a peace of mind that the child will not be able to communicate with an unauthorized person and will have no access to content that may not be appropriate for the child.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
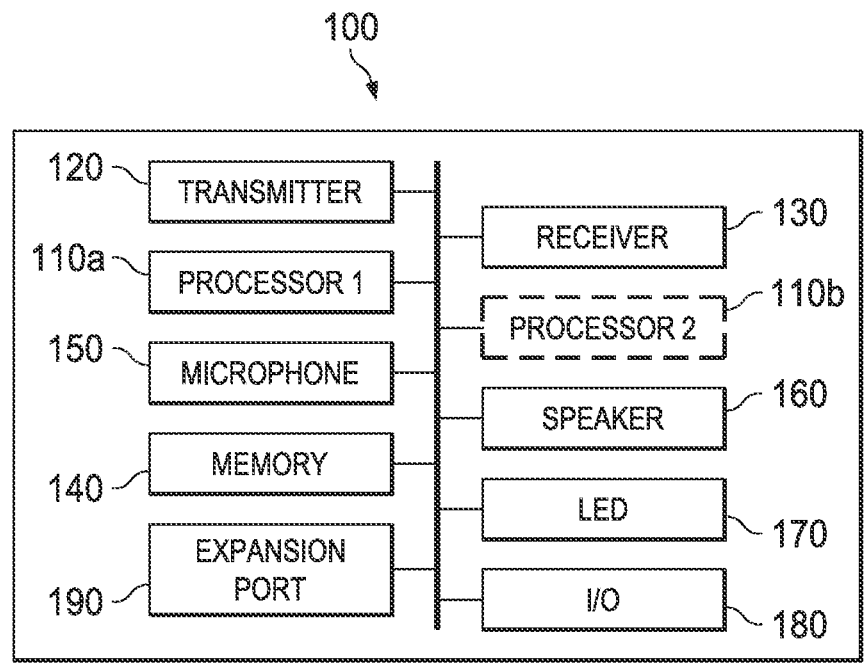
FIG. 1 depicts a schematic diagram of one embodiment of a non-cellular wireless entertainment phone device.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a non-transitory computer readable medium, hardware circuitry or the like, or any combination.

Before describing example embodiments in detail, it may be helpful to provide an overview of the invention. An object of the invention is to enrich the lives of young children, leveraging the functionalities and benefits of telecommunications networks, wireless cellphones and accessories as well as children's play toys, entertainment devices, learning and educational devices. Embodiments disclosed herein provide new non-cellular wireless devices, systems, methods, and computer program products that can achieve this object.

The new type of non-cellular wireless devices disclosed herein can be implemented as handheld devices (hereinafter referred to as "child" devices) capable of operating in at least two modes of operation: a first mode that allows a user of the child device to communicate with other devices via a parent device, and a second mode in which any communication with the child device is restricted to a parent device and/or a particular website implementing an embodiment of the invention. For example, one embodiment provides a child device that can switch between a phone mode and an entertainment/toy mode. In the phone mode, the child device can function as a robust wireless phone. In the entertainment/toy mode, the child device can function as a toy play phone and entertainment device. Switching between different modes of operation can be done in various ways by the parent device and/or the particular website. In one embodiment, the switching of an operation mode on the child device can be done by sending a control signal from a parent device communicatively connected to the child device.

More specifically, in the phone mode, the child device can connect wirelessly via Bluetooth, infrared, frequency modulation (FM) transmission or any suitable wireless connection to a cellular phone, a smart phone, a wireless enabled device, or a wide area network (WAN)-connected device (collectively referred to herein as the "parent" or "master" device). The child device can operate as a dependent or a "slave" unit under the control of the parent device. In this way, the child device can gain access to any wireless or wired telecommunications network through the parent device to which the parent device can connect. In some embodiments, when connected via a hub or gateway the child device can operate using Voice Over Internet Protocol (VoIP) or other similar network based communication and transmission technology.

In addition to a cellular or smart phone, examples of a parent device might include any Wi-Fi-enabled device such as a portable hotspot, wireless modem, wireless hub, router, gateway, access point, laptop, tablet, or notebook, among others. Through a tethered or wireless connection with the parent device, a user of the child device can establish a voice or data connection with another machine, transfer rich media or other types of data from another machine over a network, interact with electronic games on the network, or perform other functions allowed by such a connection. Examples of rich media may include, but are not limited to, audio, video, images, text, etc. Examples of a network may include the Internet, a cellular network, a wireless network, a private network, or other platforms.

In embodiments disclosed herein, each mode of operation has a set of functions. The sets of functions may be distinct from each other and may not overlap. For example, in the entertainment/toy mode, the child device may not have an active Bluetooth connection with the parent device or wireless hub. Instead, the buttons and features of the child device operate to transform the child device into a toy or entertainment device where pushing different keys produces different sounds (audio files) or has other desired effects. The sound effects may coincide with a theme of the child device to the amusement of the child. Or, the buttons may perform some other function, such as to remotely control a toy vehicle, or as a remote control for a PC or TV based video game.

In some embodiments, the child device can be designed for use by various age groups, including young children ages 2-15+ who are not yet ready for, or not in need of a fully functioning cellular or smart phone. To this end, the entertainment/toy mode can have various age-appropriate configurations. For example, in some embodiments, the entertainment/toy mode may be configured to allow a user to record and playback audio files such as voice memos that could then be altered and played back to the amusement of the child, to play games or run other applications, and to send and receive text or multimedia messages. In some embodiments, the entertainment/toy mode may be configured to allow a user to take photos, videos, and audio clips. The child device may operate to store the recorded media content in a built-in or removable memory. The information stored on the child device can be transferred or synchronized from the device to another device or machine (which may or may not be the parent device) through a wireless or wired connection or via removable memory.

Embodiments disclosed herein can address many issues. For example, the expense of mobile and smart phones may cause parents of young children to hesitate in allowing their children to use their mobile phones. In the event that a parent does hand over their mobile phone to a child, the parents have no control over how the child interacts with the device, leaving it open for them to make unintended phone calls, answer calls unintentionally, send errant text messages, incur data usage charges, access inappropriate content or websites, physically damage the device, etc. By contrast, in embodiments disclosed herein, the level of access and parties the child is able to communicate with can be entirely controlled by a parental figure. The child will not be able to communicate with someone who is not authorized to communicate with the child and the child will not be able to access unauthorized content. Further, the parent device can remain safely out of the child's hands, eliminating the risk of damage to the more expensive and fragile parent device.

Additionally, embodiments may address the risks associated with electromagnetic field (EMF) exposures. An EMF is a physical field produced by moving electrically charged objects. It affects the behavior of charged objects in the vicinity of the field. The potential health effects of the very low frequency EMFs put out by cellular antennas or surrounding power lines and electrical devices are the subject of on-going research and a significant amount of public debate. Currently, the effects of radio frequency waves radiated by cellular/wireless phones on human tissue, specifically brain tissue, are not fully understood. However, those skilled in the art can appreciate that unknown risks posed to children, whose skulls are only a fraction of the density of the skulls of a fully developed adult, and whose brains are still developing, could be significantly and substantially higher than those of adults whose brains are fully developed. Bluetooth devices emit in the microwave radio frequency spectrum and may still have a risk associated with electromagnetic field exposures. However, Bluetooth devices generally emit about $1/1000^{th}$ the output of cellular phones, and the Bluetooth power output is also lower than other Wi-Fi devices. It is believed, therefore, that using a Bluetooth device can dramatically reduce a child's exposure to radiation compared to that from cellular or other higher outputting EMF emitting wireless devices.

Another issue that can be addressed by this invention is the lack of adequately engaging learning activities for small children that teach them about the safe and proper use of wireless communication devices. Cellular phones, smart phones, Wi-Fi devices and the likes have grown in usage and popularity every year since their commercial inception in the early 1980's. The invention can prepare young children for their later use of more costly yet more robust and complex communication devices. History has shown that the adoption age of cellular phones among children has dropped consistently year over year. One study suggests that up to 75% of 12 year olds in the US in 2010 already have their own mobile phone. The parental usage controls allow children to learn about this technology safely and in a controlled fashion dictated fully by the parent.

Furthermore, embodiments can remove potential restrictions posed by single-purpose devices such as a toy phone, a child phone, or a slave Bluetooth handset. Toy phones as they exist today are quite limited. For example, a user can press a button on a conventional toy phone and pretend to talk. The toy phone may play one or more reactive sound effects. However, it provides no real feedback and/or communication functionality to the user. Likewise, child phones as they exist today provide very limited functions. Their ability to engage with a child begins and ends with the phone call it makes or receives. When the child's phone is not being used for its phone capabilities, it is practically useless to the child. Furthermore, the physiological and social risks associated with cellular phones as it relates to children, discussed previously, are still present in the current mobile phone products that target children today. Functionality limitations are present for slave Bluetooth handsets as well because they only function as a dependent phone. Furthermore, they can be costly and complicated to use and are not designed with use by children as young as 3 years of age in mind.

Embodiments of a child device disclosed herein can entertain and educate a child whether the child device is or is not actively connected to a parent device. For example, a child could visit a website implementing an embodiment of the invention and play an online game at the website. In response to an action by the child, a server hosting the website may operate to establish an audio and/or data connection to the child device and place one or more simulated phone calls and/or send text/picture/video messages to the child device as part of a game play. Or the child may use the device to input or speak an answer to a question via the device.

When functioning as an entertainment device/toy and with its ability to have any manner of accessories attached to it, the child device can be transformed into a robust play toy. For example, with a car graphic cover plate theme set and snap-on wheels, it can become a toy car with accompanying sounds. With a princess cover plate theme set and a castle charging dock, it can become a fairytale play set. With its Bluetooth and infrared capability, it also has the ability to interact with other Bluetooth-enabled or infrared devices, like a computer, for interactive gameplay and educational activities. Its modularity makes it a far more robust and mutable toy than just a toy phone. Used in tandem with other devices on the system, it could enable a game of "tag" or other peer-to-peer type activities. When used in tandem with multiple dependent child devices, it could also be used as a walkie-talkie or two-way communication device on a closed network.

In some embodiments, a child device can be configured for use by a 3-year old child. The child device can be constructed of durable materials and can feature a multi-step break away hinge, suited for use by small children, in order to preserve the longevity and enhance the value of the device. Further, the child device can be water and/or particle resistant.

In some embodiments, a child device can be controlled entirely by a parent device, allowing parents full control of how and when the child device is connected to enable the device to make and receive calls, send and receive SMS/MMS messages, download audio and content files, assign contacts to one-touch dialing keys and assign ring tones. Control logic can reside on the parent child device itself in a manner similar to the logic employed when pairing a conventional Bluetooth hands-free headset with a Bluetooth capable phone. In some embodiments, additional logic can be applied through the use of a mobile phone application that will allow parents to selectively pass through calls only to or from certain callers to the child device.

In some embodiments, when the child device is connected through a server based network, the logic of which types of activities are permitted can reside within an individual user's account on the server. In this example, individual child devices can establish a connection through the server via any number of access points, such as a hub or gateway, but still only be able to communicate to devices or end users of whom the parent has approved in the account settings. Further, if a child is not responding to a parent's attempts to call or message the child when the child device is connected to the server, parents can remotely "hotline" or "restrict" the child device, routing all calls and messages from the child device to the parent until the parent removes the "hotline" or "restriction" on the child device. In this example parents have effectively made the child device only capable of making and receiving calls from the parents until the parent takes the child device off of the "restriction" or "hotline" status.

In some embodiments, a child device can include removable and interchangeable front and rear covers, allowing the user to change the visual appearance or theme of the device. Additionally, the child device can be implemented with or without a functional display.

In some embodiments, a child device can be rechargeable with a built-in or removable battery. Optionally, the child device may have an on-board or removable memory.

In some embodiments, a child device may include a voice recorder and playback. An audible locator can be activated either via a base station (e.g., a charging cradle) or from a parent device (e.g., via a radio frequency or RF) or from a remote device such as a key fob. A proximity alarm can be set and turned on from the parent device, notifying the user of the parent device when the child's device "wanders off" and gets out of range from the parent, acting as a wireless electronic leash.

In some embodiments, a child device can be configured to tether (via USB or Bluetooth or other wireless or wired connections) to a computer in order to further customize firmware, software, phone settings/behavior, and/or user applications.

In some embodiments, a child device can be configured to transfer media files, to and from any device with an established connection to the child devices, (via USB or Bluetooth or other wireless or wired connections) automatically or manually, dependent on settings from a parent device.

In some embodiments, a child device can be configured to communicate with a parent device via a mobile phone application. The mobile phone application may be platform independent and may run on various operating systems of currently available smart phones such as Android, iPhone, Blackberry, Window Mobile, etc. or on future operating systems as they become commercially available.

In some embodiments, a child device can be configured to automatically and dynamically change functions associated with physical buttons, keys, or other types of actuators on the child device when the child device is utilized in a particular scenario. For example, various audio or multimedia files may be assigned to the different buttons on the child device, or various audio files can be assigned to the opening and closing of the child device or the power up and power down sequence of a child device.

In some embodiments, a child device may include a functional camera and be configured to store pictures either on a built-in memory or on a removable memory. The image files can be transferred from the child device to a parent device, another user on the system, or a PC, and vice-versa.

In some embodiments, a child device may include a functional audio player capable of playing a variety of audio/music files. The audio files may be stored on a built-in memory or on a removable memory storage medium. These audio files and other types of files can be loaded onto the child device from a personal computer (PC) or transferred via Bluetooth either from a parent device or a PC, with or without an active connection to a supporting website.

Embodiments disclosed herein can bridge a gap between cell phones/smart phones and toy phones as they exist today. With embodiments disclosed herein, parents can provide their children with a safe and equally (if not more) functional alternative to cell phones/smart phones and children can demonstrate that they can be responsible with a multi-function mobile phone without having to enter into a contract, pay an additional monthly access fee, or purchase a much more costly, and perhaps more physiologically and socially dangerous cell phone/smart phone.

Embodiments of a child device may operate in various environments, including one involving one or more parent devices and one or more child devices, as well as more complex environments in which there may be multiple parent devices, hubs, or other hardware configurations. Example embodiments will now be described in further detail below with references to FIGS. 1-6.

FIG. 1 depicts a schematic diagram of one embodiment of child device 100 configured to operate in at least a first and second modes of operation. In some embodiments, the first mode may have a first set of functionality and the second mode may have a second set of functionality. In some embodiments, switching between the modes can be controlled by external logic residing on a separate device and/or location. In some embodiments, the first set of functionality may include the ability to communicate with a smart phone, a cell phone, or a wireless hub or node to allow a user to make and receive phone calls or otherwise talk to other users. In some embodiments, the second set of functionality does not include the ability to make or receive phone calls. In some embodiments, the first and second sets of functionality may include distinct functions that do not overlap. In some embodiments, the first and second sets of functionality may partially overlap. In some embodiments, a child device capable of operating in two modes of operation may be referred to as a dual-mode device.

As used herein, the term "parent" may refer to a user that has administrative privileges or control over a parent device and a child device. A parent device may refer to any device that can communicate with child device 100 and contains logic able to switch child device 100 between different modes of operation. Examples of parent devices include cell phones and smart phones, and may also include computers including desktop and laptop computers, notebook and tablet computers, mobile computing devices, or other devices equipped with cellular and/or Wi-Fi technologies.

In the non-limiting example of FIG. 1, child device 100 may include first and second processors 110a and 110b, transmitter 120, receiver 130, memory 140, microphone 150, speaker 160, light-emitting diode (LED) 170, input/output (I/O) 180 and expansion port 190. Although child device 100 may be implemented to include additional components not shown in FIG. 1, in some embodiments, child devices 100 may exclude components that could enable child device 100 to directly connect to a cellular network. Example components of child device 100 will now be described.

Processors 110a and 110b may function independently or in concert to provide functionality to child device 100. For example, in some embodiments, processor 110a can perform a read operation and, at the same time, processor 110b can perform a write operation to allow child device 100 to receive or otherwise download data wirelessly. With multiple processors, child device 100 is not required to be connected to a computer or be placed in a programming mode in order to perform the download operation. Those skilled in the art will appreciate that child device 100 can be implemented in various ways and is not limited to a single- or dual-processor configurations. One example of a suitable processor 110a or 110b can be a Digital Signal Processor (DSP) available through CSR of Cambridge, UK, capable of processing and supporting Bluetooth functionality. Transmitter 120 and receiver 130 may allow wireless communication with child device 100. Although illustrated in FIG. 1 as separate functional blocks, those skilled in the art will appreciate that transmitter 120 and receiver 130 may be implemented as a single transceiver unit. Other non-cellular wireless communications means may also be utilized. One example of a transceiver can be a Bluetooth transceiver.

Memory 140 may store instructions translatable by the processor or processors to implement various modes of operation of child device 100. Memory 140 can be any type of computer memory that can retain the stored information even when not powered. Many such computer memories exist today and thus are not further described herein. Example modes of operation will be further described below. One example of a memory can be a Secure Digital (SD) memory card.

Microphone 150 and speaker 160 may allow a user of child device 100 to record and play messages, songs, etc., and further allow the user to converse with another user when child device 100 is in a communication-enabled mode. This feature will also be further described below.

LED 170 represents a semiconductor light source for indicating particular operational modes. For example, LED 170 may be configured to emit a first color when child device 100 operates in a first mode and emit a second color when child device 100 operates in a second mode. The color of LED 170 may exhibit the same or different brightness when on. Additional functionality of LED 170 will be discussed below.

Input/output component ("I/O") 180 may provide an interface for a user of child device 100. For example, child device 100 may include a keypad. A user may push a button or input a telephone number via the keypad. Through I/O 180, child device 100 may receive the user input and communicate same to a parent device. Additional functionality of I/O 180 will be further discussed below. In one embodiment, I/O interface 180 includes a USB port.

Expansion port 190 may allow additional hardware/software components to be added, such as to customize a phone or provide additional functionality, discussed below.

The shape, exterior surface of child device 100 including any touch keys may appear to resemble a cell phone, a toy phone, or some combination thereof. For example, child device 100 may be shaped to resemble any existing cell phone, including those having a flip style, having a touch screen, having a certain color scheme, etc. However, embodiments may be able to allow phone communications with other user devices or switch to operate as an entertainment or toy phone based on instructions from a parent device or other external logic stored in a cell phone or computer. The logic may dictate what days of the week calls may be made or received, what time of day calls may be made or received, who can be called, whom calls can be received from, etc. In other words, child device 100 may or may not contain logic to switch to a phone mode by itself.

In some embodiments, child device 100 may provide a visual indicator of a mode in which child device 100 is operating. For example, a halo or ring around child device 100 may be illuminated with blue light to indicate phone mode and green light may indicate play mode. Light may be provided by one or more LEDs 170. LEDs 170 may further provide an indicator that there is an incoming phone call, that the user is on a phone call, that the user is connected to a Wi-Fi node, etc. Examples of how LEDs 170 may indicate a mode in which child device is operating, an incoming phone call, etc., include, but are not limited to, change in color or brightness and flashing or blinking.

Child device 100 may include different components or modules including logic associated with desired functionality. Unlike toy cell phones, which may play preset sounds or sequences of sounds, including pre-recorded greeting or other messages, child device 100 may include more robust functionality that can allow users to record their own songs, take pictures or other video images/movies, play games, etc. Functionality may be associated with either a non-communicating (or "entertainment" or "toy") mode, with a communicating (or "linked" or "smart") mode, or both. In some embodiments, a parent or other administrator may establish what functionality child device 100 has in each mode. Functionality may include, for example, a camera to take pictures/ videos as well as store images in memory, an audio or video player associated with I/O 180 to play music or videos, a clock, or a game player. For example, in some embodiments, licensed and original content such as ringtones, images/wallpapers and audio files can be utilized when the phone is in the "toy" mode by assigning them to physical features such as buttons, keys, gestures, etc. on child device 100.

Figure 2:
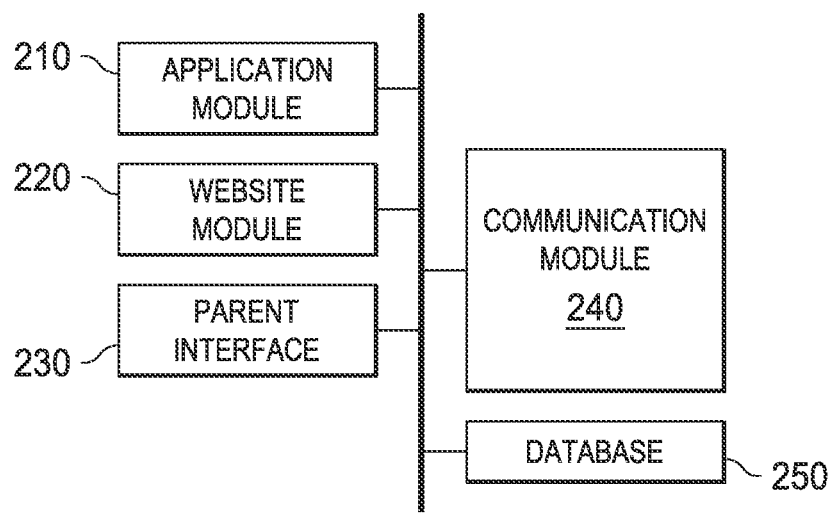
FIG. 2 depicts a functional diagram illustrating modules for providing functionality to one embodiment of a non-cellular wireless entertainment phone device.

In some embodiments, a child device can be configured to operate in two modes: a communication mode and a non-communication mode. FIG. 2 depicts a functional diagram of one embodiment of a child device having a plurality of modules for providing desired functionality for a selected mode. In this example, the plurality of modules includes application module 210, website module 220, parent interface 230, communication module 240 and database 250. Functionality associated with the communicating mode which may not be available in the non-communication mode may include any one or more of the following:

Automatic or manual connection via Bluetooth technology;
Short Message Service (SMS)/Multimedia Messaging Service (MMS) messages pass-through to/from phone numbers or phone contacts on a parent device;
1-touch dialing assignment of contacts from the parent device;
Ring tone assignment;
Automatic/manual transfer of camera images from the child device to the parent device;
Audio file sharing with digital rights management (DRM) validation; and
Game and application transfer and file sharing.

Application module 210 may include logic to connect with one or more of website module 220, parent interface 230, communication module 240 and database 250 and provide logic to support switching between modes of operation.

Website module 220 may include logic to connect with one or more of application module 210, parent interface 230, communication module 240 and database 250 for interaction with a website or browser application to provide selected functionality. For example, website module 220 may provide functionality to allow a user of the child device to interact with others via a website. Although illustrated in separate functional blocks in FIG. 2, application module 210 and website module 220 may be combined to provide custom control logic.

Parent interface 230 may include logic to connect with one or more of application module 210, website module 220, communication module 240 and database 250. As an example, parent interface 230 may provide information about a child device and usage thereof to a parent device. Software running on the parent device may operate to present the information via a user interface. A parental figure or authorized user of the parent device can view and manage their accounts, devices, access and usage. As another example, parent interface 230 may provide information about a child device and usage thereof to a hub, access point, router, gateway, or other intermediary implementing an embodiment of the invention. Software running on the intermediary device may operate to communicate the information to a server at the backend. The server may store the information in a central database. The server may host a website implementing an embodiment of the invention. The server may generate a user interface and present the information via the user interface. The user interface may be delivered to a parental figure or authorized user via the website or a mobile application to a parent device. The parental figure or authorized user of the parent device can view and manage their accounts, devices, access and usage via the user interface.

Communication module 240 may include logic to connect with a parent device or an intermediary device via a wired and/or wireless connection. For example, communication module 240 may allow a user of a child device to make a call to her grandma through a wireless connection to her parent's phone, which connects to a cellular network and/or an Internet Protocol (IP) network, which connects to switching centers and interconnects with other telephony network providers which transport the call to grandma.

Database 250 may store information about the device itself, its user(s), or a combination thereof. For example, database 250 may be configured to store passwords, authorized caller lists, authorized call times/dates, user preferences, devices authorized to perform as a parent device, preferred communication networks, website username and the like.

Communication between application module 210, website module 220, parent interface 230, communication module 240 and database 250 may allow a child to interact with a website or a user of an electronic device without requiring the child to remember a network resource address, phone number, or other alphanumeric data or protocol normally needed for communication.

Figure 3A:
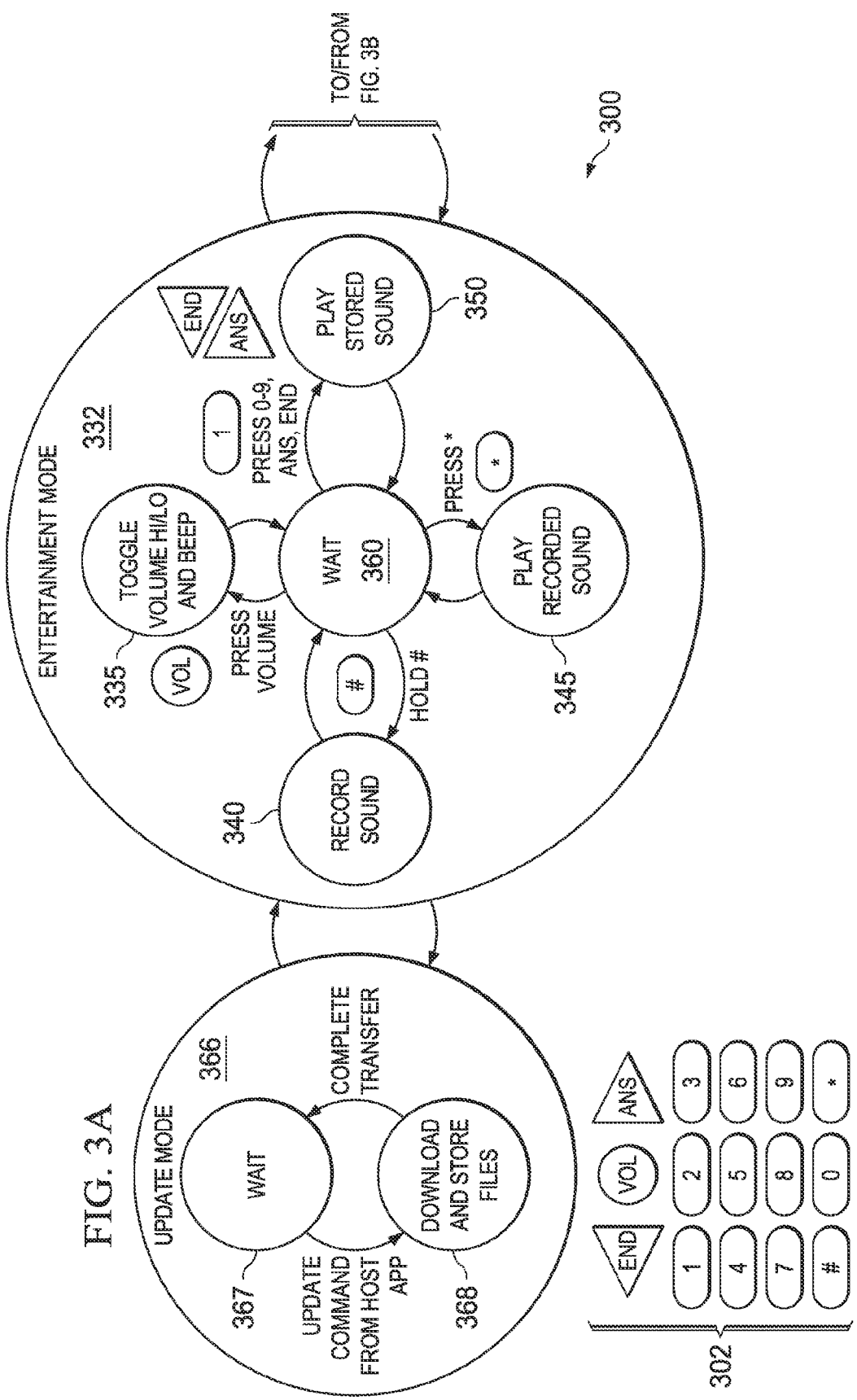
FIGS. 3a and 3b depict example modes of operation of one embodiment of a non-cellular wireless entertainment phone device.
Figure 3B:
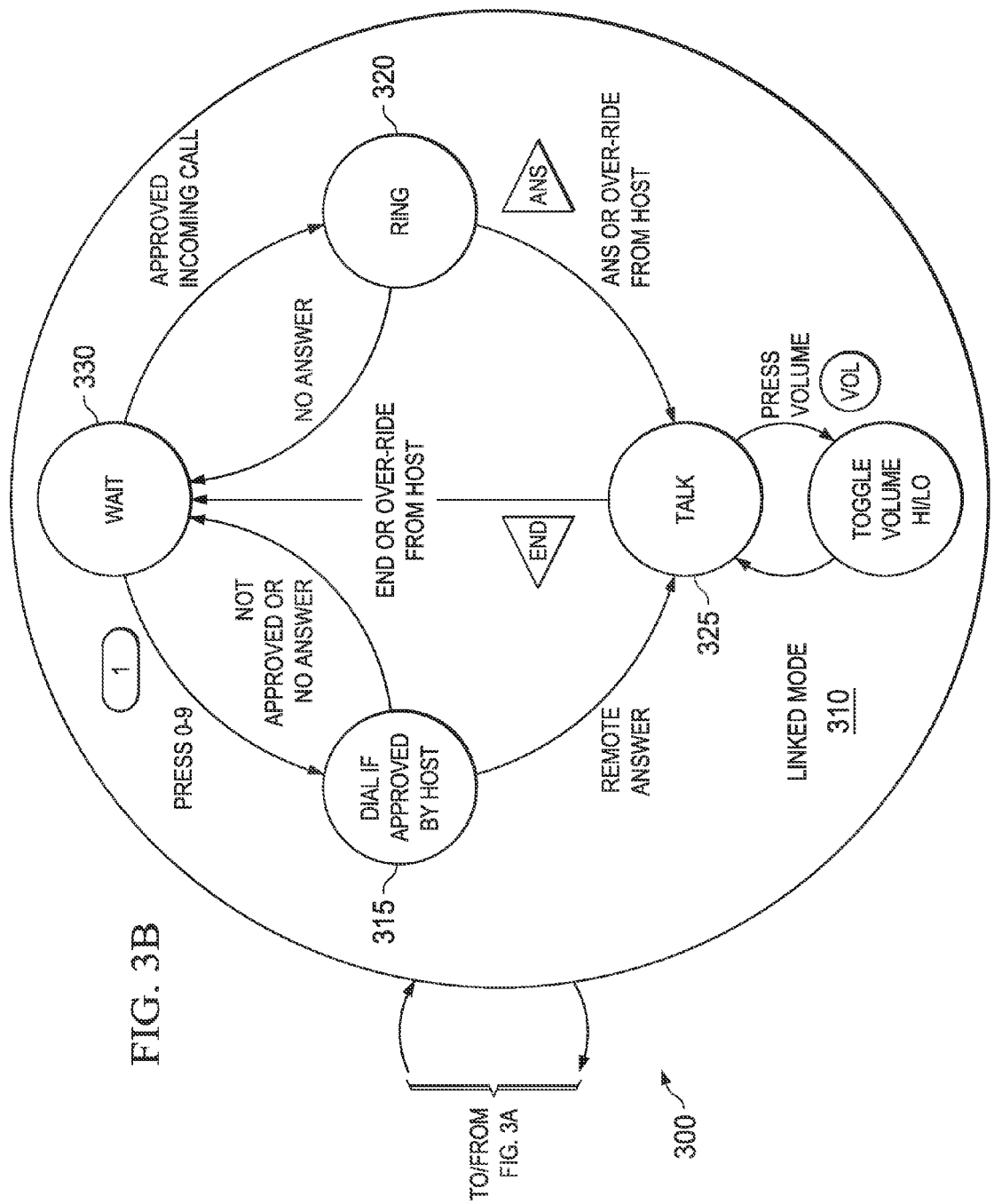

Embodiments of a child device disclosed herein may be switched between two or more modes. FIGS. 3A and 3B depict portions of a diagram indicating various operational modes of a child device. In this example, child device 300 may start in entertainment mode 332. Upon receiving a signal from a control device such as a host or parent device (not shown), logic in child device 300 may switch to wait state 330 in linked mode 310. An example of a host may be a server hosting a website implementing an embodiment of the invention. For illustration purposes, the term "parent device" is used to represent various types of control devices suitably configured to control child device 300.

In linked mode 310, keys or buttons on keypad 302 of child device 300 may be depressed or otherwise activated by a user of child device 300 into dial state 315 to make a call to a remote device through the parent device. An example of a remote device can be an analog or digital phone associated with an individual. If child device 300 is not approved to make the call to the remote device or if the remote device does not answer the call, it returns to wait state 330 in linked mode 310. If child device 300 is approved to make the call to the remote device and the remote device answers the call, child device 300 may enter into talk state 325 in linked mode 310. In talk state 325, a user of child device 300 may use a volume button on keypad 302 to adjust the volume of a speaker on child device 300. When the call ends, child device 300 returns to wait state 330. The call may be terminated by child device 300, the remote device, the host, or the parent device. When an approved call comes in through the host or the parent device, the approved incoming call may cause child device to enter ring state 320. If the user of child device 300 answers the approved incoming call, child device 300 may enter talk state 325. Otherwise, it returns to wait state 330 in linked mode 310.

The host or parent device can trigger a switching from linked mode 310 to entertainment mode 332 by sending a control signal to child device 300. In entertainment mode 332, logic or instructions stored on child device 300 may allow buttons on keypad 302 to be associated with another set of functions. These functions may differ completely or partially from those described in linked mode 310. For example, in entertainment mode 332, the volume button on keypad 302 may allow a user of child device 300 to adjust volumes in volume toggling state 335 which is independent of any state in entertainment mode 332 and may additionally play a beeping sound when pressed. When the volume button is not pressed, child device 300 automatically returns to wait state 360. As another example, a particular button on keypad 302 can be configured to cause child device 300 to enter sound recording state 340 such that as long as that particular button is held or pressed, a built-in microphone may operate to record a sound and store same in a memory location on child device 300. Child device 300 may include built-in components such as a microphone, a speaker, and a memory similar to those described above with reference to child device 100. When that button is no longer held or is pressed again, child device 300 automatically returns to wait state 360. The recorded sound may be played by pressing a predetermined button on keypad 302. For example, pressing the "*" button on keypad 302 may cause child device 300 to enter replay state 345, access a memory location to retrieve a recorded sound, and play the recorded sound through a built-in speaker of child device 300. When the recorded sound ends or when the "*" button is no longer held or pressed, child device 300 automatically returns to wait state 360. As yet another example, when a certain button on keypad 302 is pressed, child device 300 may enter play state 350 to play a stored image, audio, video, or multimedia file corresponding to the button pressed.

In some embodiments, when connected to a parent device such as a computer, logic in child device 300 may detect the connection and automatically switch to programming or update mode 366. In one embodiment, the connection between a parent device and a child device can be physical and logical. In one embodiment, the connection between a parent device and a child device can be solely logical. In update mode 366, child device 300 may initially be in wait state 367 waiting for instructions from the parent device which may cause child device 300 to enter into download state 368 to receive additional instructions and/or data. For example, the parent device may cause child device 300 to update software to add new functionality, update anti-virus files, etc. After each transfer is complete, child device 300 may return to wait state 367 in update mode 366. Child device 300 may return to entertainment mode 332 upon being disconnected or per a signal received from the parent device.

A parent device may establish a communication link with a child device in various ways. The connection may be made, for example, using Bluetooth technology. Bluetooth is a wireless technology standard for exchanging data among fixed and mobile devices over short distances using wavebands from 2400-2480 MHz, creating personal area networks (PANs) with high levels of security. The communication range of Bluetooth devices may vary depending on class of radio used in an implementation:

Class 1 radios—used primarily in industrial use cases—have a range of about 100 meters or 300 feet.

Class 2 radios—most commonly found in mobile devices—have a range of about 10 meters or 33 feet.

Class 3 radios—have a range of up to about 1 meter or 3 feet.

Bluetooth technology is designed to have very low power consumption. Maximum power output from a Bluetooth radio is about 100 mW, 2.5 mW, and 1 mW for Class 1, Class 2, and Class 3 devices, respectively, which puts Class 1 Bluetooth devices at a power consumption level lower than that of cellular phones. Class 2 and Class 3 Bluetooth devices consume much lower power than Class 1 Bluetooth devices.

The use of Bluetooth or similar wireless technologies allows a parent device to communicate with a child device without requiring the use of cellular minutes, data rates, or other phone/data plans. Additionally, the use of Bluetooth technology may serve as a basis for keeping track of children. In some embodiments, a child device may be tethered or otherwise secured to a child. In some embodiments, the child device may be configured, such as by a parent accessing an application on the parent device, to continuously ping the parent device. The parent device may be configured to continuously listen for the ping. As discussed above, in embodiments disclosed herein, data exchange between a parent device and a child device is done over short distances. Thus, if a parent device is able to detect a ping from a child device, the detection indicates that the child device is within range. For example, if a parent device implements a Class 2 Bluetooth radio, detecting a ping from the child device may indicate that the child device is within a range of about 33 feet or less. If the ping is not received, an alarm may be triggered to alert the parent that the child device is out of range. An advantage to this type of monitoring may be that the monitoring may be performed without excessive battery drain or requiring a user to constantly activate a scan, such as found in other types of technology. Furthermore, those skilled in the art will appreciate that this functionality may be used in addition to apps/logic that enable the parent to initiate a scan for a Bluetooth device or use GPS or cell technology to locate a child device. Other implementations may also be possible. For example, instead of a parent device continuously pinging a child device, the child device may ping the parent device and listen for a response from the parent device.

As described above, a user of a child device may call or receive calls from approved individuals through a parent device having cellular and/or IP network connectivity. However, this ties up the parent device's phone line. It may be desired to provide other communication mechanism through which embodiments of a child device can communicate via voice, text, image, or video messages, or to access online content.

Figure 4:
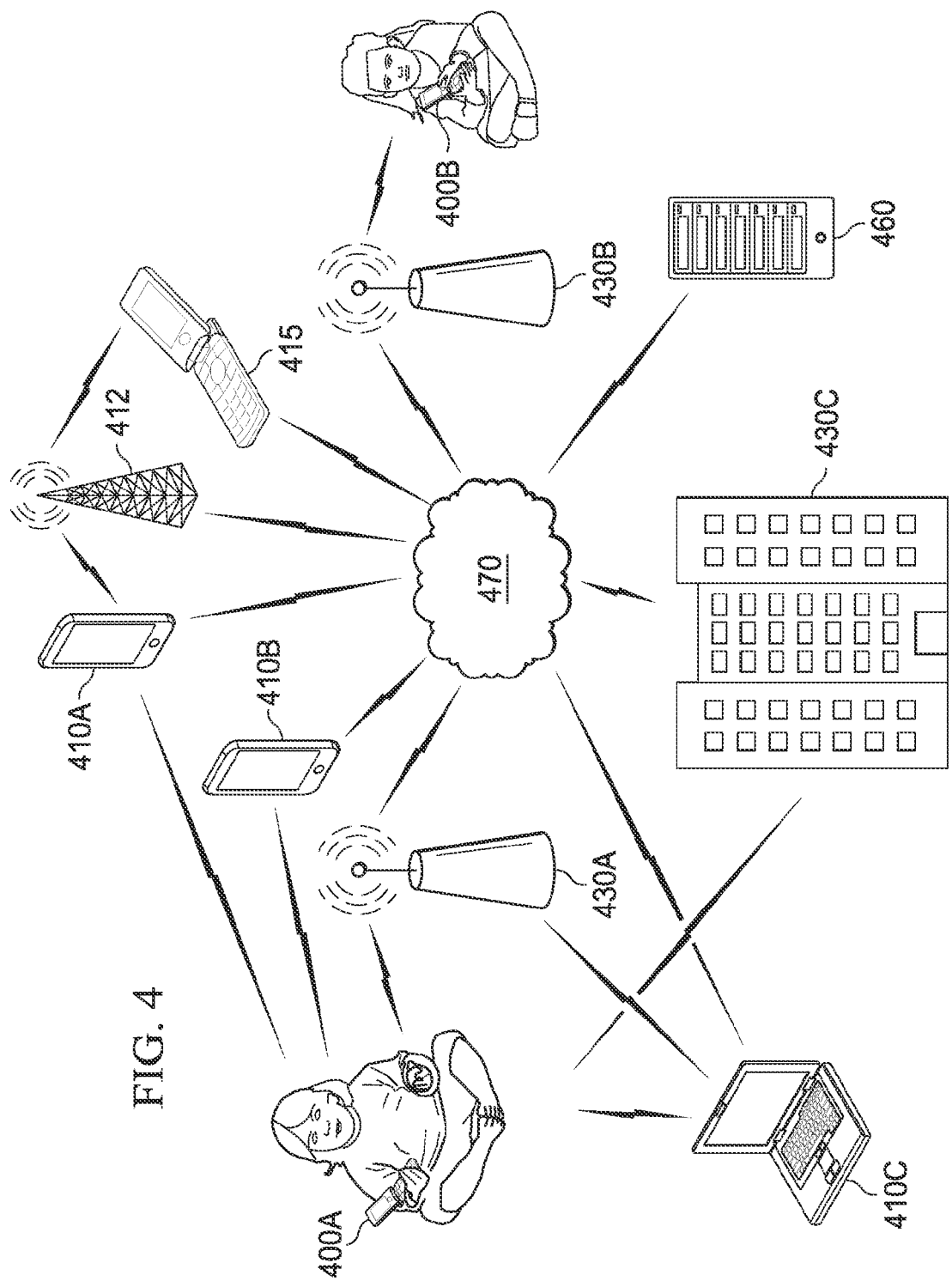
FIG. 4 depicts by example a complex communications environment in which embodiments disclosed here may be implemented.

FIG. 4 depicts by example a complex communications environment in which embodiments disclosed here may be implemented. In the example of FIG. 4, child device 400A may be communicatively connected to parent device 410A, 410B, or 410C via a wireless connection as described above. Through parent device 410A, 410B, or 410C, a user of child device 400A may make and receive calls to user devices 415 and 400B via IP network 470 and/or cellular network 412. Through parent devices 410A, 410B, 410C, a user of child device 400A may also have access to a website hosted on server machine 460.

In some embodiments, a user of child device 400A may make and receive calls to user devices 415 and 400B through non-parental communications devices 430A, 430B, and 430C that are communicatively connected to IP network 470 and/or indirectly to cellular network 412. Examples of suitable communications devices 430A, 430B, and 430C may include gateways, routers, hubs, access points, or other suitable intermediary devices. For the sake of brevity, various types of communications devices that are implemented with proprietary control logic disclosed herein are collectively referred to herein as hubs. Each hub may provide access to the Internet over a wireless local area network through the use of a router connected to an Internet service provider. Using parent device 410A, 410B, or 410C, a parental figure or authorized user such as a guardian or teacher can configure a child device and/or a hub to allow for wireless connections between the child device and the hub such that, if the child device is within range of a hub, the child device may connect to that hub and perform various functions without requiring a parent device. For example, once connected to hub 430A, child device 400A may make calls to and receive calls from user devices 415 and 400B via IP network 470 and/or cellular network 412 without requiring parent device 410A, 410B, or 410C.

Embodiments of a hub disclosed herein may be a proprietary Class 1 Bluetooth device with a rechargeable battery. Similar to portable hotspots or Wi-Fi devices available on the market today, embodiments of a hub disclosed herein can be configured to provide a secure connection to a wireless device within its range. This secure connection can allow Voice Over IP and data transmission from a child device to other child devices or to any mobile or landline phones, all of which can be configurable by a parent or authorized user through a website or via an application running on a parent device. In this way, embodiments of a child device disclosed herein when enabled by a parent or authorized user can communicate with other user devices. Examples of suitable user devices may include, but are not limited to, other child devices, cell phones, smart phones, computers (desktops, laptops, notebooks, tablets, etc.), personal digital assistants (PDAs), or other electronic devices.

Figure 5:
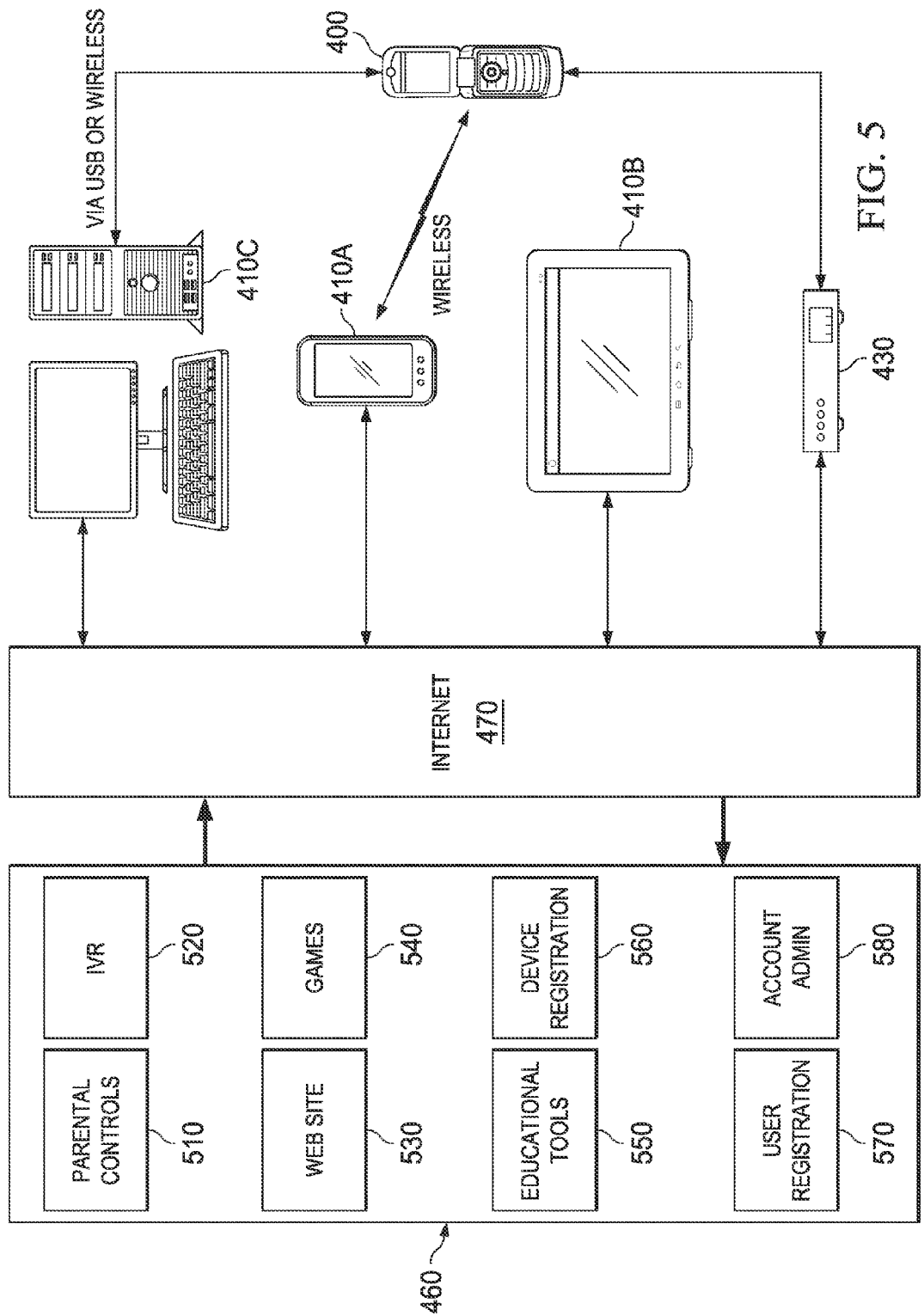
FIG. 5 depicts a schematic diagram illustrating exemplary functionality of an embodiment of a server configured to communicate with parent devices, access points, and child devices implementing embodiments disclosed herein.

FIG. 5 depicts a schematic diagram illustrating exemplary functionality of an embodiment of a server configured to communicate with parent devices, hubs, and child devices implementing embodiments disclosed herein. Server 460 may host website 530, which may allow a user to access services provided by server 460. Functionality associated with child device 400 in a communication or phone mode may allow child device 400 to access website 530 via Internet connection 470 made possible by parent device 410A, 410B, or 410C, or hub 430. In some embodiments, logic to associate a phone number with a person may be maintained at a parent device, a hub, or a server hosting the website.

A parent or authorized user can access website 530 using any of the above mentioned devices via IP network 470. Website 530 may provide several functions. It can provide an interface through which the parent or authorized user can manage one or more user accounts, shop for accessories, content, or other types of products for a particular model of a child device, engage with characters through games and activities, learn about cellular, Wi-Fi or Bluetooth safety for children, and learn about and donate to charity organizations.

A user of child device 400 may access website 530 through, for example, cell phone 410A, tablet 410B, desktop computer 410C, or hub 430. Communications may be possible via a wireless (including cellular, Wi-Fi, Bluetooth, etc.) or a wired connection (including a USB or other physical connection).

Embodiments may take into consideration that some users of the website may not yet be able to read and use design features and technology to enhance and ease their user experience. For example, audio rollovers such as "play games", "watch videos", and so on and picture icons in addition to words may enable games or other uses without the user needing to read. Further, with an active connection between child device 400 and website 530 the child might speak a command such as "play games" into child device 400 to execute a command using voice recognition software hosted on IVR 520.

In some embodiments, in addition to hosting website 530, server 460 may include parental controls module 510, interactive voice recognition (IVR) module 520, games module 540, educational tools module 550, device registration module 560, user registration module 570, and account administration module 580. Some modules may be implemented by control logic residing on server 460 to allow a parental figure or authorized user to register one or more child devices, configure parental controls such as managing which individuals can make and receive calls to and from the registered child device(s), manage their account information, etc. Additionally, some modules may be implemented by control logic residing on server 460 to provide educational tools, games, and interactive activities through website 530. Such control logic may be implemented in software, hardware, or a combination thereof. As an example, suitable control logic may be implemented in a computer program product comprising at least one non-transitory computer readable medium storing instructions translatable by server 460 to perform functionality associated with parental controls module 510, IVR module 520, website 530, games module 540, educational tools module 550, device registration module 560, user registration module 570, account administration module 580, or a combination thereof.

A parental figure or authorized user can interact with user registration module 570 to register one or more child devices. The user may be prompted to add/identify each child device. A Bluetooth scan is one way to identify a child device. There may be separate setting controls for each child device, or it may be possible to apply first settings to additional child devices in order to avoid having to go through the set-up process more than once. Registration may include generally registering a user name, address and phone number associated with a child device, or may include detailed registration, including designating selected networks or hubs accessed by the child device.

A parental figure or authorized user can interact with parental controls module 510 to configure parent controls for the registered child device(s). For example, the user can select from their contacts individuals who can ring-through to a particular child device. There can be different levels of such ring-through calls. For example, the user can specify that a call from a particular individual to a particular child device can be made "Always" or "Ask me first". As a specific example, a parent can approve a child's best friend to make calls to the child's device and set the approval level to "Always", allowing a Bluetooth connection to be automatically initiated for each call to the child device and the child device to enter into a phone mode accordingly to take the call. The parent may also list the child's grandma as an approved caller. However, the parent may set the approval level to "Ask me first" since the parent may want the option to take grandma's calls.

In some embodiments, a user at a parent device can determine to whom their child is allowed to initiate a call, and assign speed dial functionality to a button on a child device associated with the child. For each contact, a user at the parent device can select "anytime" or "ask me first". So, following the above example, if the parent selects "anytime" for grandma, the child can use the registered child device to dial grandma's phone any time the assigned speed dial button is pressed without involving the parent so long as the child device is in connected mode. If the parent selects "ask me first" for phone calls to grandma, then when the child presses the assigned speed dial button for grandma, a notification pops up on the parent device: "Lincoln is trying call Grandma. Is that okay?" At that time, the parent can select "Allow" or "Don't Allow." Selecting "allow" will initiate the call to grandma through the parent device. Selecting "don't allow" will return the child device to a wait state, as described above.

As mentioned above, embodiments may allow for different modes of operation, including at least one mode that allows for communication and at least one mode that does not allow communication with devices other than a parent device or may not allow any communication at all. Some functionality may be enabled in either a communicating mode or a non-communicating mode. For example, in some embodiments, a user of a parent device can enable/disable the Bluetooth connection, set time limits (or none) for the connection, or see if a child device is currently connected to a call and to whom. In some embodiments, there may be an alert (e.g., "Lilah has two minutes left,") and/or an option to extend the connection mid-call. In some embodiments, a user at a parent device can initiate an intercom connection to a child device, allowing 2-way communication between the parent device and the child device. In some embodiments, a user at a parent device can trigger an audible locator in the event the child misplaces their child device. In some embodiments, a user at a parent device can customize sounds from a pre-loaded menu for incoming call, audible locator, and button sounds. If there are any custom theme sounds downloaded in their cloud account (for example, princess sound effects), the parent will have access to these also.

In some embodiments, a user at a parent device can allow a child device to communicate directly with another device for games and activities. A user at the parent device can specify a level of such a direct communication. Example levels may include, but are not limited to, "Always," "Never," and "Ask Me First." For example, referring to FIG. 5, a user at parent device 410A can specify a "Always" setting, allowing server 460 to make calls to child device 400 (by initiating a Bluetooth connection for each call) without involvement from the parent. This may allow games module 540 running on server 460 to interact with a child at child device 400 as part of a gameplay. If "Never" is specified, server 460 will not interact directly with child device 400 and, in one embodiment, will not ask for permission to connect directly with child device 400. If "Ask me first" is specified, when a game begins server 460 may send a message to parent device 410A asking for permission. For example, server 460 may prepare and send a message to parent device 410A asking "Lincoln wants to get game messages on his child device from our website. Is that okay?" At that time, a user at parent device 410A can then select "Don't Allow" or "Allow." In some embodiments, if "Allow" is selected, the permission may be valid while a particular game is running or for a determined period of time, for instance, an hour, 3 hours, a day, etc.

A parental figure or authorized user can interact with account administration module 580 to manage their account information. An account can have different profiles for parent(s) or other users with administrative privileges, and for the child(ren) or other users of child device 100. A parent profile may be associated with a user or a parent device. Account administration module 580 may be configured to keep track of user interactions with website 530, including purchases made by each registered user through website 530. Example user interactions with website 530 will now be described.

Although not shown, server 460 may include a download library from which a registered user may be able to download sounds, wallpapers, startup animations, games, videos, apps, etc. In some embodiments, a user at a parent device can purchase sound effects, ringtones, wallpapers, videos, games, apps, music, etc. from their own mobile phone or device and push them out to a child device communicatively connected therewith.

Additionally, through parental controls module 510 a parental figure or authorized user can designate an "allowance" each month for a child to spend on child device products. The child can access their allowance for purchases and purchases may be monitored and controlled completely by the parental figure or authorized user. In some embodiments, the child may be allowed to view, via a user interface displayed on the child's device or a browser running an instance of website 530 on a client device, how much allowance is left, what they've spent, and what they need to save to get the products they want. Embodiments can incorporate arithmetic activities and charts that can help the child learn how to manage their money. Visuals such as color and gray images of a product can be manipulated to reflect an amount of allowance needed to purchase the product.

Once child device 400 is enabled to communicate via Internet 470, child device 400 may be approved to download sounds, wallpapers, startup animations, games, videos, apps, etc. from various websites and devices on Internet 470. In some embodiments, child device 400 may be configured to allow creation of a wish list based on user input and generation of a visual representation indicating a level of fulfillment of such a wish list. For example, child device 400 may generate a bingo card-type visual indicating which accessories/products on a child's wish list have been "collected" and which ones remain to be added. The wish list and the corresponding visual may be sent out to family members and friends, letting them know which products they want and which ones they already have. In some embodiments, a wish list works like a gift registry. The wish list can also prompt family members and friends to add money to the child's allowance so the child can purchase the accessories/products themselves. Further, a child might earn credits to purchase physical or digital goods by achieving various levels in learning or game-play activities on the site.

In some embodiments, when a user plays a game on child device 400 while logged into their account via website 530, the game level may be saved on child device 400 or a data store (not shown) associated with website 530. This allows the user to pick up where they left off in the game the next time they play the game. Some embodiments may be configured to display their game stats versus those of their friends and siblings, and even tracks improvement ("you're getting better in geography," "your counting has improved 20%"). Users can challenge friends to games (such as via their contact list), either via a message "try and beat my score" or in a multi-player game in real time.

In some embodiments, a user of child devices can keep track of their friend's game scores, play games with friends, and see their friend's child device collection of apps. Even see what friends are online at the same time they are and voice or video chat (or play games with their friends incorporating video chat/webcam). Some embodiments allow a user to develop a social network where they can share with their friends. For example, for child devices with camera and video functionality, photo and video sharing (or live video feeds) may be possible. For users who can spell and read, chat messaging, etc., may be possible.

In some embodiments, website 530 may include an on-line store configured to allow for a child to navigate and virtually play as they shop. For example, website 530 may allow a child to design their child device 400 with different cover plates using rollover and drag and drop functionality. Each cover plate may correspond to a predetermined theme. Website 530 may operate to suggest content and accessories that go along with the theme, including content like ringtones, songs, sound effects, etc. Additional content may include wallpapers, startup animations, music, videos, games, apps, etc. The child can then add their customized child device and/or accessories to a wish list or shopping cart. Adding it to a shopping cart will allow the child to either make a purchase using an allowance associated with their account or profile or get another user associated with child device 400 to make the purchase.

In some embodiments, child device 400 may include physical components with corresponding control logic to provide interactive games. For example, some embodiments of child device 400 may include a built-in adapter or auxiliary port to which an additional physical component or accessory may be connected. The additional physical component or accessory may provide additional functionality to child device 400. Example components may include, but are not limited to, remote controllers, game controllers, cameras, etc. As a specific example, an added camera could allow a user of a child device to participate in a photo scavenger hunt on certain prizes provided by a server at the back end. In some embodiments, images captured by a camera component of child device 400 can be provided to server 460. With IVR 520 or other recognition technology such as facial recognition software, server 460 may recognize a user ("Hi, Lucy!") and/or an item and may be configured to allow a user to play virtual dress-up, or morph into their favorite characters. Furthermore, with IVR 520, server 460 can be configured to respond to voice commands from a user ("Play 'Animal Madness'") rather than mouse clicks. As described above, a user can record their dialogue for characters using child device 400. With the web cam, a user can record a video using child device 400, upload the video to server 460, and share the video via website 530.

Embodiments may also provide access to different areas of website 530. For example, games module 540 may store various games that are age-appropriate for a user, including educational type games where kids help children in need may be a theme of a game. Other logic implementing website 530 may allow point-of-purchase donations, such that a user can donate part of their allowance to support a charity, etc.

Server 460 may include additional modules not shown in FIG. 5. For example, referring to FIG. 2, in one embodiment, a parental figure or authorized user of a parent device may download at least application module 210, website module 230, and parent interface 230 (referred to as client device modules) from server 460. In some embodiments, a mobile application implementing these client device modules may be made available through other sources such as an online market or app store. When such a mobile application is downloaded and launched on a parent device, a splash page may appear with a logo, characters, and an audio as the application loads. The mobile application may include a user interface through which a user of the parent device can interact with website 530 and/or other functionality provided by server 460. Once connected to server 460, a user of the parent device may be prompted to either enter their user name and password for their account or create one. Once authenticated by server 460, such a user may have the option to "stay logged in" to the app, so they don't have to re-enter their name and password each time they open it, or for security, they can opt to log-in using a personal identification number (PIN) or touch screen gesture each time.

Some interactions may occur entirely between a parent device and a child device. For example, in some embodiments, a user of parent device 410B can send pre-recorded "character calls" to child device 400. Example character calls may include a birthday message or a good luck message from an animated character or a celebrity, etc.

Some embodiments of child devices can be configured with an ability to connect to each other via a parent device or a hub. This creates endless opportunities for multi-player interactive game play. As an example, a device-to-device connection may be implemented using near-field communication (NFC). NFC refers to a set of standards for smartphones and similar devices to establish radio communication with each other by touching them together or bringing them into close proximity. With NFC, communication is possible between an NFC device and an unpowered NFC chip called a tag. If equipped with NFC, users can play a game "tagging" other child devices.

Some embodiments of child devices can provide access to other technologies as well. For example, a child device may be configured with a processor, accelerometer and a compact audio/video interface such as high-definition multimedia interface (HDMI). In a mirror mode, the child device may output via an HDMI cable plugged into a HDMI equipped TV and display games or movies up onto the TV, with the child device acting as a game controller or a remote control. With a camera, the child device may allow a user to scan quick response (QR) codes or recognize content in programs, enabling gameplay/interaction. With text capabilities, the child device may allow a user to send/receive texts and clues from, for instance, TV programs or internet based games.

In some embodiments, the invention may leverage the power of cloud computing. Cloud computing refers to the use of computing resources, including hardware and software, for a user's data, software, and computation. As used herein, a cloud environment may generally refer to the use of such computing resources such that an end user is able to access applications through a web browser or mobile app, but the software and user data can be stored on servers at remote location(s). For example, an entity owning and operating server 460 may outsource some part of hardware and software maintenance and support to a cloud provider. Suppose the cloud provider may provide the infrastructure and platforms on which user accounts may reside. A parental figure or authorized user can access, via a computer or another parent device, a user account that exists in the cloud to manage one or more child devices. The application may "sync" with the cloud automatically at every launch so parental controls and other settings stay up to date. Different child devices may exist as profiles within a single user account. Furthermore, content may be delivered and stored at the user level in a cloud environment. Various types of content, such as audio files, image files, screen savers, start-up animations, etc. can be downloaded and synchronized to each child device. Additional services provided by server 460 may also reside in the cloud.

Accordingly, a cloud environment may provide some of the functionality and parental controls to a child device by transforming them from a Bluetooth handset, dependent at all times on connection via a parent handset, into a fully robust phone that allows children (users of child devices) to engage, via a parent handset, a Hub or other connection, their world in a safe manner, all while never circumventing the complete control of the parent. Depending upon implementation, an account with a cloud provider may or may not be required to get the full functionality of a child device.

In some embodiments, a child device can establish a connection to a cloud environment through an internet connection enabled by an embodiment of a hub. The hub can acquire Internet connectivity through an existing Wi-Fi access point. In the cloud environment, parents can configure and apply various types of usage control they would want to impose on a child device including time of day and/or days of the week that messages and/or calls can be made and received, who can make and receive such messages and/or calls, what types of content are acceptable for the child device to receive and send, what the maximum number of minutes each call can have, etc.

The cloud can synchronize with the mobile phone application enabling the parent to make changes or updates to the configuration settings from their smart phone while away from a computer with Internet access. Multiple smart phones can be granted access to the same cloud account so one parental figure can make changes using one parent device and other parent devices stay synchronized, or vice versa. Furthermore, all updates to any child device may be completed in real time. Embodiments allow configurations to be done via the cloud. The cloud may send updates to a child device via synchronization through a USB computer connection or wirelessly via a hub, computer or parent device.

Based on the above-described principles, a child device can also establish connections to a hub anywhere the hub has been activated or installed. Example hubs may be installed at children oriented business or locations, at a friend's house, or a public place. Each hub can be designated as a wireless communication zone and any child device can establish a connection through the cloud to the corresponding account using, for instance, a unique identifier associated with the child device, in order to perform the above-described functions that have been enabled by a parental figure or authorized user. An example of a unique identifier associated with the child device can be the Media Access Control (MAC) address assigned to a network interface of the child device. Other types of identification may also be utilized.

As a specific example, an administrator of a business or public place can identify, via an administrator interface of a hub installed there, the MAC address of a child device when the child device is turned on. The administrator interface may display all cloud user names within range of that hub. When a parental figure or authorized user accompanying a child to a designated wireless communication zone, they may register with the hub, via the administrator or via application module 210, in order to allow their child's device access to that particular hub. Once connection to the hub is established, the child device may operate as if it is connected to a hub at home or the parent handset as described above causing the child device to remain within the previously established parental control parameters. In some embodiments, once the initial relationship is established on the hub of a business or public place, a parental figure or authorized user may be able to use their cell phone or any other phone to connect to the child device remotely. Connections may be made via the cloud and a mobile phone app running on the parent device as described above.

In some embodiments, a toll-free number may be established to allow all incoming callers be routed via the cloud using a security identifier that is unique to each child device. For example, when a parent makes a call from their registered parent device to a child device via the toll-free number, the parent may enter a unique security identifier. Based on the unique security identifier and caller ID from the parent handset provided, the cloud may route the call by locating where on the cloud the identified child device is connected and routing the call to that child device. If the child device is not currently connected to the cloud, the parent will receive a notification stating that the child device that the parent is trying to reach is not currently connected to the cloud.

In some embodiments, a parent device can establish a direct connection to a child device that is currently connected to the cloud other than that parent device via a one-touch functionality of a mobile phone application running on the parent device. As a specific example, a user of the parent device can open the mobile phone application and press "Call {Child 1}" or "Message {Child 2}" button. Selection of such a button may cause the parent device to establish a connection with a cloud provider and provide the necessary information such as a unique identifier identifying a child device associated with Child 1 or Child 2 which, in turn, causes the cloud to make a connection to the child device as described above. All the logic and routing to enable that connection happens behind the scenes and is transparent to the parent.

Hub 430C, discussed above, may be utilized in various business/ventures. Examples of businesses/ventures include, but are not limited to:

Schools—an administrator associated with the school may disable child devices or functionality during certain times of the day, in certain areas, or provide only limited communication functionality to discourage cheating but still allow a parent to contact a child, to prevent a camera from operating or sending pictures in unauthorized areas but still allow a student to purchase a lunch, etc.

Movie theaters—an administrator associated with the theater may disable child device functionality to prevent talking on a phone during a movie.

Ice cream/candy shops, ice cream trucks, athletic field complexes, toy stores, miniature golf/fun centers, fast food restaurants, amusement/theme parks, children's museums, book stores, convenience stores, mall food courts—an administrator associated with the business may allow certain functionality to provide a more interactive experience with the business, for example allowing visitors to play games associated with the business or to be notified of promotional messages from the business.

In some embodiments, a hub can be configured to include a digital wallet. In some embodiments, a parent can login to the cloud and load funds via a credit card or other account and set usage controls on the digital wallet. Usage controls placed on individual child devices could include approved locations that child devices are permitted to make a purchase from or per transaction or per day spending limits. The hub may communicate transactional data to the cloud such as merchandise and food purchases or movie and theme park admissions. Further, if a child attempts to make a purchase that is outside the preapproved parameters, the hub may be configured to automatically request approval from a parent by sending a message to a parent device associated with the parent. To add a measure of security to the digital wallet functionality, a personal identification number (PIN) could be required, which would be transmitted via the hub to the cloud for validation. This would ensure that a person in possession of a child device and trying to use funds on that handset is the authorized user, safeguarding the funds in the event that a handset is lost or stolen.

Figure 6:
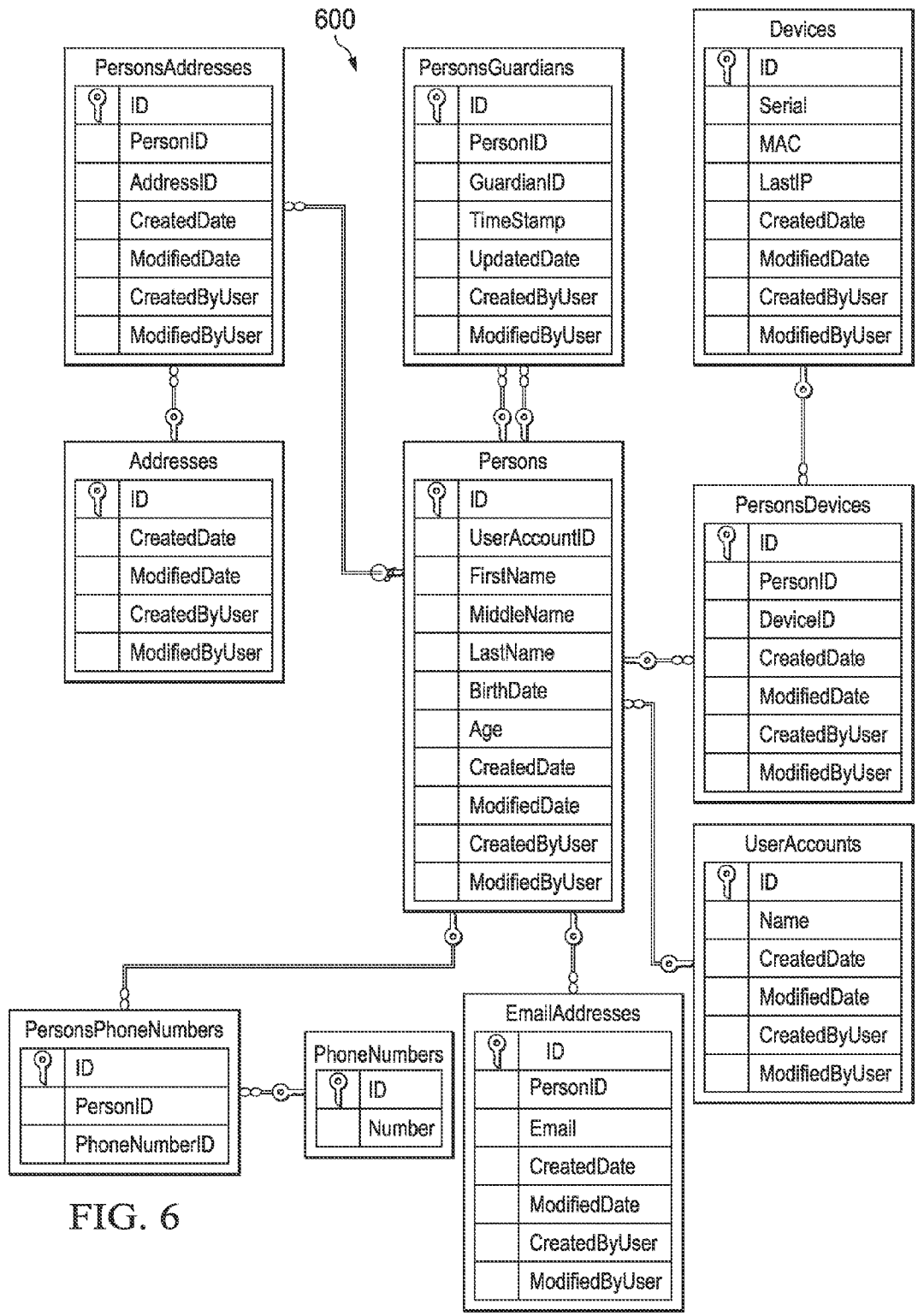
FIG. 6 depicts one example of a data model employed by embodiments disclosed herein to store various types of information on different devices.

To store information about child devices, hubs, parent devices, user accounts, user preferences, communication modes, and other information, embodiments may include a data model. FIG. 6 depicts one example of a data model employed by embodiments disclosed herein to store various types of information on various types of devices. Data model 600 can be used to map and store, for example, user accounts. The various components and relationships found in any data model may vary. One of ordinary skill in the art will appreciate that various services provided by embodiments disclosed herein may implement same, different or similar data models.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. An apparatus, comprising:
   at least one processor;
   communication means for receiving and transmitting non-cellular wireless signals;
   a plurality of physical keys or buttons; and
   a memory containing instructions translatable by the at least one processor to perform:
      operating in an entertainment mode;
      responsive to a signal received from a control device via the communication means, switching from the entertainment mode to a wait state in a linked mode, the switching including automatically and dynamically changing one or more of the plurality of physical keys or buttons from a first set of functions for the entertainment mode to a second set of functions for the linked mode, wherein the control device is capable of directly or indirectly connecting to a cellular network, a computer network, or a combination thereof;
      responsive to one or more of the plurality of physical keys or buttons being depressed or activated, entering into a dial state in the linked mode for making a call to a remote device through the control device via a non-cellular wireless connection, wherein the control device passes the call to the remote device via the cellular network, the computer network, or a combination thereof;
      if the call to the remote device is approved and the remote device answers the call, entering into a talk state in the linked mode; and
      if the call to the remote device is not approved, if the remote device does not answer the call, or if the call has ended, returning to the wait state in the linked mode.

2. The apparatus of claim 1, wherein the instructions are further translatable by the at least one processor to perform:
   detecting a physical or logical connection to a parent device; and
   automatically switching to an update or programming mode.

3. The apparatus of claim 1, wherein the entertainment mode comprises a plurality of functions and wherein each of the plurality of functions is associated with a key or button of the plurality of keys or buttons.

4. The apparatus of claim 1, wherein pressing a key or button of the plurality of keys or buttons in the entertainment mode activates a recording or media player function associated with the key or button.

5. The apparatus of claim 1, wherein the instructions are further translatable by the at least one processor to perform:
   responsive to a second signal from the control device, switching from the linked mode to the entertainment mode.

6. The apparatus of claim 1, wherein the instructions are further translatable by the at least one processor to perform:
   responsive to an approved call coming in through the control device, entering into a ring state in the linked mode;
      if the approved call is answered, entering into the talk state in the linked mode; and
      if the approved call is not answered or if the call has ended, returning to the wait state in the linked mode.

7. The apparatus of claim 1, wherein the first set of functions for the entertainment mode are completely different or at least partially different from the second set of functions for the linked mode.

8. A system comprising:
   a control device configured for connecting to a cellular network, a computer network, or a combination thereof; and
   an apparatus comprising:
      at least one processor;
      communication means for receiving and transmitting non-cellular wireless signals;
      a plurality of physical keys or buttons; and
      a memory containing instructions translatable by the at least one processor to perform:
         operating in an entertainment mode;
         responsive to a signal received from the control device via the communication means, switching from the entertainment mode to a wait state in a linked mode, the switching including automatically and dynamically changing one or more of the plurality of physical keys or buttons from a first set of functions for the entertainment mode to a second set of functions for the linked mode;
         responsive to one or more of the plurality of physical keys or buttons being depressed or activated, entering into a dial state in the linked mode for making a call to a remote device through the control device via a non-cellular wireless connection, wherein the control device passes the call to the remote device via the cellular network, the computer network, or a combination thereof;
         if the call to the remote device is approved and the remote device answers the call, entering into a talk state in the linked mode; and if the call to the remote device is not approved, if the remote device does not answer the call, or if the call has ended, returning to the wait state in the linked mode.

9. The system of claim 8, wherein the instructions are further translatable by the at least one processor to perform:
  detecting a physical or logical connection to a parent device; and
  automatically switching to an update or programming mode.

10. The system of claim 8, wherein the entertainment mode comprises a plurality of functions, and wherein each of the plurality of functions is associated with a key or button of the plurality of keys or buttons.

11. The system of claim 8, wherein pressing a key or button of the plurality of keys or buttons in the entertainment mode activates a recording or media player function associated with the key or button.

12. The system of claim 8, wherein the instructions are further translatable by the at least one processor to perform:
  responsive to a second signal from the control device, switching from the linked mode to the entertainment mode.

13. The system of claim 8, wherein the instructions are further translatable by the at least one processor to perform:
  responsive to an approved call coming in through the control device, entering into a ring state in the linked mode;
  if the approved call is answered, entering into the talk state in the linked mode; and
  if the approved call is not answered or if the call has ended, returning to the wait state in the linked mode.

14. The system of claim 8, wherein the first set of functions for the entertainment mode are completely different or at least partially different from the second set of functions for the linked mode.

15. A computer program product comprising at least one non-transitory computer readable medium storing instructions translatable by at least one processor of an apparatus to perform:
  operating in an entertainment mode;
  responsive to a signal received from a control device via communication means of the apparatus, switching from the entertainment mode to a wait state in a linked mode, the switching including automatically and dynamically changing one or more of the plurality of physical keys or buttons from a first set of functions for the entertainment mode to a second set of functions for the linked mode, wherein the communication means is configured for receiving and transmitting non-cellular wireless signals, wherein the control device is capable of directly or indirectly connecting to a cellular network, a computer network, or a combination thereof;
  responsive to one or more of the plurality of physical keys or buttons being depressed or activated, entering into a dial state in the linked mode for making a call to a remote device through the control device via a non-cellular wireless connection, wherein the control device passes the call to the remote device via the cellular network, the computer network, or a combination thereof;
  if the call to the remote device is approved and the remote device answers the call, entering into a talk state in the linked mode; and
  if the call to the remote device is not approved, if the remote device does not answer the call, or if the call has ended, returning to the wait state in the linked mode.

16. The computer program product of claim 15, wherein pressing a key or button of the plurality of keys or buttons in the entertainment mode activates a recording or media player function associated with the key or button.

17. The computer program product of claim 15, wherein the instructions are further translatable by the at least one processor to perform:
  detecting a physical or logical connection to a parent device; and
  automatically switching to an update or programming mode.

18. The computer program product of claim 15, wherein the instructions are further translatable by the at least one processor to perform:
  responsive to a second signal from the control device, switching from the linked mode to the entertainment mode.

19. The computer program product of claim 15, wherein the instructions are further translatable by the at least one processor to perform:
  responsive to an approved call coming in through the control device, entering into a ring state in the linked mode;
  if the approved call is answered, entering into the talk state in the linked mode; and
  if the approved call is not answered or if the call has ended, returning to the wait state in the linked mode.

20. The computer program product of claim 15, wherein the first set of functions for the entertainment mode are completely different or at least partially different from the second set of functions for the linked mode.

* * * * *